(12) United States Patent
Nikles et al.

(10) Patent No.: US 9,804,001 B2
(45) Date of Patent: Oct. 31, 2017

(54) BRILLOUIN OPTICAL DISTRIBUTED SENSING DEVICE AND METHOD WITH IMPROVED TOLERANCE TO SENSOR FAILURE

(71) Applicant: OMNISENS SA, Morges (CH)

(72) Inventors: Marc Nikles, Atalens (CH); Etienne Rochat, Valeyres Sous Ursins (CH); Fabien Briffod, Morges (CH); Jean-Charles Montavon, Lausanne (CH); Chin Sanghoon, Ecublens Vd (CH)

(73) Assignee: OMNISENS S.A., Morges (CH)

( * ) Notice: Subject to any disclaimer, the term of this patent is extended or adjusted under 35 U.S.C. 154(b) by 0 days.

(21) Appl. No.: 14/775,384

(22) PCT Filed: Mar. 18, 2013

(86) PCT No.: PCT/EP2013/055533
§ 371 (c)(1),
(2) Date: Sep. 11, 2015

(87) PCT Pub. No.: WO2014/146676
PCT Pub. Date: Sep. 25, 2014

(65) Prior Publication Data
US 2016/0025524 A1    Jan. 28, 2016

(51) Int. Cl.
*G01D 5/353* (2006.01)
*G01L 1/24* (2006.01)
*G01K 11/32* (2006.01)

(52) U.S. Cl.
CPC ..... *G01D 5/35364* (2013.01); *G01D 5/35348* (2013.01); *G01K 11/32* (2013.01); *G01L 1/242* (2013.01)

(58) Field of Classification Search
CPC ........... G01D 5/35364; G01D 5/35348; G01D 5/35383; G01D 5/268; G01D 5/353;
(Continued)

(56) References Cited

U.S. PATENT DOCUMENTS

| | | | | |
|---|---|---|---|---|
| 5,623,336 A | * | 4/1997 | Raab | ............... G01J 3/4412 356/73.1 |
| 6,417,957 B1 | * | 7/2002 | Yao | .............. H04B 10/25758 250/227.11 |

(Continued)

FOREIGN PATENT DOCUMENTS

| | | | |
|---|---|---|---|
| JP | 2007033183 A | * 2/2007 | ............. G01D 5/363 |
| WO | 2010/058438 A1 | 5/2010 | |
| WO | 2012/119124 A1 | 9/2012 | |

OTHER PUBLICATIONS

Espacenet Englisht Translation of JP 2007033183 A.*
International Search Report from International Patent Application No. PCT/EP2013/055533, dated Dec. 20, 2013.

*Primary Examiner* — Tarifur Chowdhury
*Assistant Examiner* — Mohamed K Amara
(74) *Attorney, Agent, or Firm* — Greer, Burns & Crain, Ltd.

(57) ABSTRACT

Brillouin optical distributed sensing device and method is provided and includes a structure for generating an optical pulsed signal and an optical probe signal. The structure includes a circulation component for directing the optical pulsed signal to a sensing optical fiber, and directing an optical measurement signal with Brillouin scattering information arising from the sensing optical fiber toward a detection apparatus. Also included is an optical routing component for configuring the device to allow generating: (i) according to a first configuration, an optical measurement signal with stimulated Brillouin scattering information resulting from the interaction of the optical pulsed signal, (Continued)

and an optical probe signal propagating in the sensing optical fiber in a direction opposite to the optical pulsed signal, or (ii) according to a second configuration, an optical measurement signal with spontaneous Brillouin scattering information resulting from the propagation of the optical pulsed signal in the sensing optical fiber.

16 Claims, 3 Drawing Sheets

(58) Field of Classification Search
CPC ............... G01D 5/35358; G01K 11/32; G01K 11/3206; G01K 2011/322; G01K 2011/324; G01K 15/00; G01K 3/00; G01K 2219/00; G01L 1/242; G01L 1/246; G01L 11/025; G01B 11/18; G01B 11/165; G01B 2290/25; E21B 47/123; E21B 47/06; G01J 5/0821; G01J 5/08; G01J 1/0425; G01J 3/0218; G01J 5/0862; G02B 6/14; G01F 1/6884
See application file for complete search history.

(56) References Cited

U.S. PATENT DOCUMENTS

| | | | | |
|---|---|---|---|---|
| 7,539,231 B1* | 5/2009 | Honea | ................ | H01S 3/06795 359/333 |
| 8,699,009 B2* | 4/2014 | Li | ................ | G01B 11/18 356/33 |
| 9,500,560 B2* | 11/2016 | Chin | | |
| 2001/0024317 A1* | 9/2001 | Yao | ................ | H01S 3/302 359/334 |
| 2002/0015154 A1* | 2/2002 | Goldner | .............. | G01C 19/722 356/465 |
| 2009/0316134 A1* | 12/2009 | Michael | ................ | G01C 3/08 356/4.01 |
| 2011/0019178 A1* | 1/2011 | Vlatas | ................ | G01B 11/18 356/32 |
| 2011/0019198 A1* | 1/2011 | Sanders | ................ | G01C 19/727 356/461 |
| 2012/0281201 A1* | 11/2012 | Brown | ................ | G01K 11/32 356/33 |
| 2012/0307253 A1* | 12/2012 | Sanders | ................ | G01C 19/727 356/461 |
| 2014/0233600 A1* | 8/2014 | Lee | ................ | G01K 15/005 374/1 |
| 2015/0168253 A1* | 6/2015 | Chin | ................ | G01M 11/083 356/73.1 |
| 2015/0308923 A1* | 10/2015 | Chin | ................ | G01D 5/35364 356/73.1 |
| 2015/0377656 A1* | 12/2015 | Bastianini | .......... | G01D 5/35364 356/301 |

* cited by examiner

BRILLOUIN OPTICAL DISTRIBUTED SENSING DEVICE AND METHOD WITH IMPROVED TOLERANCE TO SENSOR FAILURE

BACKGROUND

The invention relates to a Brillouin optical time domain analyzer device with improved tolerance to degradation and breach of sensing optical fibers.

The field of the invention is, but not limited to, distributed temperature and/or strain sensing using Brillouin scattering.

The use of Brillouin scattering in optical fibers is a well known technique for doing measurements of temperature and/or strain along large distances.

Brillouin scattering occurs when a light wave propagating in a medium (such as an optical fiber) interacts with time-dependent density variations of the medium. These density variations may be due for instance to acoustic waves or phonons propagating in the medium, and they modulate the index of refraction. A fraction of the light wave interacts with these variations of index of refraction and is scattered accordingly. Since acoustic waves propagates at the speed of sound in the medium, deflected light is also subjected to a Doppler shift, so its frequency changes.

The speed of sound in the medium depends on the temperature of the medium and on the strain. So, a variation of any of these parameters induces a variation of the frequency shift of the scattered light due to Brillouin scattering, and so may be measured.

In addition, when an intense beam such as a laser beam travels in a medium such as an optical fiber, the variations in the electric field of the beam itself may produce acoustic vibrations in the medium via electrostriction. The beam may undergo Brillouin scattering from these vibrations, usually in opposite direction to the incoming beam.

Brillouin optical time domain instruments have been done on the basis of this principle. They allow measuring the temperature and/or the strain along distributed sensors based on single-mode optical fibers which may be several kilometers long.

The applications relates mainly to the domains of geosciences, mining, oil exploitation, and civil engineering for the monitoring of large structures.

The distributed sensors are embedded in the environment or the structures to monitor. So, the optical fibers of these distributed sensors are subjected to the variations of temperature and strain of the environment along their path.

The effects of temperature and strain cannot be directly discriminated. So, in order to measure temperature independently of strain, the distributed sensors may comprise optical fibers protected by a small tube or casing which is rigid enough so as to avoid any strain on the fiber along the sensitive part. The length of the fiber in the casing is longer (of an "excess fiber length" EFL) than the casing so that the casing may be stretched in some extends (the EFL) without applying strain to the fiber. The fiber is also usually embedded in a gel in the casing for a better decoupling of strain. So the sensor is sensitive only to temperature and is not affected by strain, provided that strain applied to the distributed sensor remains within some limits (the EFL) so that it does not affect the fiber.

Of course, the distributed sensors may also comprise optical fibers subjected to temperature and strain. The temperature measurements can then be used to compensate for the thermal effects in the unprotected fiber, so as to determine the strain.

Known Brillouin optical time domain instruments are based on one or the other of the two following implementation schemes:
 spontaneous Brillouin scattering measurements, in which case the systems are usually referred to as Brillouin Optical Time Domain Reflectors (BOTDR);
 stimulated Brillouin scattering measurements, in which case the systems are usually referred to as Brillouin Optical Time Domain Analyzers (BOTDA);

In spontaneous Brillouin scattering measurements, narrow pulses of light are generated using a continuous wave laser source (usually in the infrared range) and an amplitude modulator or a gating system. These pulses of light are injected into at least one sensing optical fiber of the distributed sensor.

A backscattered optical signal is collected on the same end of this fiber. This optical signal comprises spectral components due to spontaneous Brillouin scattering generated along the sensing fiber by the propagation of the light pulses. These spectral components comprise Stokes and anti-Stokes spectrums located at about ±11 GHz of the central frequency of the laser source, with a spectral width of about 30 MHz. The Stokes spectrum comprises frequency components at frequencies lower than the central frequency of the laser source and the anti-Stokes spectrum comprises frequency components at frequencies lower than that central frequency.

For the detection, the backscattered optical signal is coherently mixed with the laser source wave, used as a local oscillator, on a photodetector. Both waves interfere, which gives rise to an electronic signal with spectral components corresponding to differences of frequencies between the backscattered optical signal and the laser source optical signal. So this electronic signal comprises spectral components around 11 GHz corresponding to the Brillouin scattering. The temperature and/or strain profiles along the fiber may then be obtained from this electronic signal using well-known electronic heterodyne detection methods and/or time-frequency analysis methods.

The spontaneous Brillouin scattering method is quite simple and allows doing instruments of relatively moderate cost because the optical part of the device remains simple. But the sensitivity which may be obtained is low because the spontaneous Brillouin scattering signal is very week. In addition, the photodetector must have a bandwidth larger that the frequency shift of the Brillouin scattering (>12 GHz), which is not favorable to high sensitivity and low noise.

So, in order to obtain accurate and efficient measurements, the stimulated Brillouin scattering method is rather used.

In stimulated Brillouin scattering measurements, narrow pulses of light are also generated using a first laser source (usually in the infrared range). These pulses of light are injected into at least one sensing optical fiber of the distributed sensor.

A continuous probe optical wave is also generated using a second laser source. This second laser source is tunable, as to allow varying the frequency of the probe wave over a frequency range covering the frequency range of the spontaneous Brillouin scattering generated along the sensing fiber by the propagation of the light pulses.

The probe optical wave is injected into at least one second optical fiber of the distributed sensor. The sensing fiber and the second fiber are connected at their distal end so that the probe optical wave travels also in the sensing optical fiber, but in the direction opposite to the light pulses. Of course, the sensing fiber and the second fiber may be just parts of a single or a same optical fiber forming a loop with a forth and back path in the distributed sensor.

When the frequency of the probe optical wave falls within the frequency range of the spontaneous Brillouin scattering generated by the pulsed optical wave, a resonance condition is established, leading to the efficient stimulation of the Brillouin scattering:

when the frequency of the probe optical wave falls within the frequency range of the Stokes spontaneous Brillouin spectrum, this stimulation induces an energy transfer from the pulsed optical wave to the probe optical wave and an amplification of the probe optical wave (gain mode);

when the frequency of the probe optical wave falls within the frequency range of the anti-Stokes spontaneous Brillouin spectrum, this stimulation induces an energy transfer from the probe optical wave to the pulsed optical wave and an attenuation of the probe optical wave (loss mode).

In these configurations, the resulting optical signal emerging from the sensing optical fiber corresponds essentially to the probe optical wave whose amplitude varies in function of the resonance conditions met along the fiber.

The resulting optical signal may then be detected with a photodetector which electronic bandwidth just needs to be large enough so as to allow obtaining the desired spatial resolution. So a photodetector with an electronic bandwidth narrower than 200 MHz is sufficient for most applications which do not requires shorter than 1 meter spatial resolution.

The frequency of the probe optical wave is varied across the Brillouin frequency range. The analysis of the resulting signals allows an accurate identification of the local resonance condition at every location along the sensing fiber and the computation of the local temperature and strain conditions.

The stimulated Brillouin scattering method allows very accurate measurements.

However, it requires a two-side access to the distributed sensor, or the use of two optical fibers connected at the distal end. So in case of breach of the fibers, or even of one of the fibers, measurements are no longer possible.

This is a serious drawback in practice, because the distributed sensors are usually embedded in structures such as pipelines, with no possibility of replacing them once embedded. In addition they are frequently used in severe environments where the risk to have them subjected locally to excessive strain is high.

It is an object of the invention to provide a device and a method for doing distributed temperature and/or strain measurements with a high sensitivity and a high accuracy.

It is also an object of the invention to provide a device and a method for doing distributed temperature and/or strain measurements which still allows measurements along at least parts of distributed sensors in case of failure or breach of the sensor.

It is a further object of the invention to provide a device and a method which allows exploiting in the best possible conditions healthy and deteriorated distributed sensors.

It is a further object of the invention to provide a device and a method which allows quick and/or automated reconfiguration of the instrumentation to adapt to the health status of the distributed sensors.

It is a further object of the invention to provide a device and a method which allows measurements on various kinds of distributed sensors already installed.

SUMMARY

Such objects are accomplished with a Brillouin optical distributed sensing device, comprising:
  means for generating an optical pulsed signal and an optical probe signal,
  circulation means for directing said optical pulsed signal to a sensing optical fiber, and for directing an optical measurement signal with Brillouin scattering information arising from said sensing optical fiber toward detection means,
  characterized in that it further comprises optical routing means for configuring the device so as to allow generating:
  according to a first configuration, an optical measurement signal with stimulated Brillouin scattering information resulting from the interaction of the optical pulsed signal and an optical probe signal propagating in said sensing optical fiber in a direction opposite to the optical pulsed signal,
  according to a second configuration, an optical measurement signal with spontaneous Brillouin scattering information resulting from the propagation of the optical pulsed signal in the sensing optical fiber.

According to a mode of realization, the device of the invention comprises optical routing means for directing the optical probe signal:
  according to the first configuration, to the sensing optical fiber so that said optical probe signal propagates in said sensing optical fiber in a direction opposite to the optical pulsed signal,
  according to the second configuration, to coupling means inserted between the circulating means and the detection means so as to combine said optical probe signal and said measurement signal on the detection means.

The optical routing means may comprise any means allowing routing the optical probe signal, such as but not limited to, for instance:
  optical switching means,
  an optical switch,
  a coupler and at least one variable optical attenuator (VOA) allowing shutting off the optical signal in one branch of the coupler.

In the first configuration, the device of the invention implements a configuration which allows measuring the stimulated Brillouin scattering resulting from the interactions of the optical pulsed signal and the optical probe signal along the sensing fiber.

In order to obtain these interactions, it is necessary that the optical probe signal and the optical pulsed signal propagate in opposite directions in the sensing optical fiber.

For instance, the optical probe signal and the optical pulsed signal may be injected in the same end of a sensing optical fiber whose other end (or distal end) is cleaved and/or coated so as to have a high reflectivity. So the optical probe signal reflected at the distal end of the fiber may interact with the optical pulsed signal injected in the fiber, and reversely.

According to a more common configuration, the optical pulsed signal may be injected to a first end of the sensing optical fiber, and the optical probe signal may be injected at the second end or the distal end of the sensing optical fiber.

The sensing optical fiber may then constitute, or be part of, a fiber loop inserted in the distributed sensing element and accessed by both ends.

Alternatively, two optical fibers connected at their distal ends may be used, one being the sensing optical fiber and the other one being used for conveying the optical probe signal to the distal end of the sensing optical fiber.

In the second configuration scheme, the device of the invention implements a configuration which allows measuring the spontaneous Brillouin scattering spectrum resulting from the propagation of the optical pulsed signal in the sensing fiber.

In that configuration, it is not necessary to access the distal end of the sensing optical fiber, or to have any specific reflectivity condition at the distal end of the sensing optical fiber. So it allows doing measurements even in case of break of the distributed sensing element including the sensing optical fiber.

In addition, in case the distributed sensing element comprises at least two optical fibers connected at their distal end (or a fiber loop), if only one of them (or one branch of the loop) is broken, then the device of the invention may be used in the second configuration for doing measurements:

from the front end of the distributed sensing element to the breaking location of the broken optical fiber. In that case the sensing optical fiber is the front portion of the broken fiber;

along the intact optical fiber and then backward along the distal part of the broken optical fiber to the breaking location, provided the two fibers are connected (or are parts of a loop). In that case the sensing optical fiber comprises the intact optical fiber and the distal part of the broken optical fiber.

So, in that case, even if one of the two fibers is broken, or if one branch of the fiber loop is broken, the device of the invention is still able to do measurements over the whole length of the distributed sensor.

For instance, distributed sensing devices may comprise one fiber protected by a casing for being exposed only to temperature and not to strain, and one fiber exposed to both, so as to be able to measure separately temperature and strain. In that case, even if the non-protected fiber is broken, the device of the invention is still able to measure temperature and strain over the whole path.

The device of the invention may further comprise tuning means for varying the optical frequency of at least one spectral component of at least one of the following optical signals: the optical pulsed signal, the optical probe signal.

These tuning means may comprise for instance:

tunable laser source(s), optical modulation means such as acousto-optics modulator(s) and/or electro-optics modulator(s).

According to some modes of realization, the device of the invention may further comprise a laser source used for generating the optical pulsed signal and the optical probe signal.

The laser source may generate a continuous wave.

The optical pulsed signal may then be generated using an intensity modulation device, such as for instance:

a lithium niobate electro-optic modulator based on a Mach-Zehnder architecture, a semiconductor optical amplifier (SOA).

In a lithium niobate electro-optic modulator comprising a Mach-Zehnder interferometer, the optical path length in one arm of the interferometer may be varied relative to the optical path length in the other arm by applying a control voltage to the device. So, an optical pulse may be generated by switching the control voltage from a value leading to destructive interferences between the optical waves in both arms of the interferometer (extinction condition) to a value leading to constructive interferences between the optical waves in both arms of the interferometer (maximum of intensity condition).

According to some modes of realization, the tuning means may comprise an electro-optic modulator for varying the optical frequency of at least one spectral component of the probe optical signal.

The electro-optic modulator may be used for modulating the intensity of an incoming optical signal according to an amplitude modulation with suppressed carrier scheme, so as to generate the probe optical signal. This probe signal comprises at least a single spectral component, either Stokes or Anti-Stokes used for generating and analyzing the Brillouin stimulated interaction. For practical reason, it can comprise two spectral components located symmetrically to the optical frequency of the incoming optical signal (for instance the frequency of the laser source). The frequency of the spectral components may be electrically adjusted with a control signal on the electro-optic modulator.

This may be done using a lithium niobate electro-optic modulator comprising a Mach-Zehnder interferometer, to which the following command voltage is applied:

a bias command voltage leading to destructive interferences between the optical waves in both arms of the interferometer (extinction condition), and, a modulation command voltage at a frequency corresponding to the desired frequency shift of the spectral components of the probe optical signal relative to the optical frequency of the incoming optical signal.

The device of the invention may further comprise a bandpass optical filter located between the circulation means and the detection means, whose bandwidth includes the Stokes or the anti-Stokes spectral range of the spontaneous Brillouin scattering spectrum potentially resulting from the propagation of the optical pulsed signal in the sensing fiber.

The Stokes spectral range comprises the spontaneous Brillouin scattering spectrum with optical frequencies lower than the optical frequency of the optical pulsed signal, whereas the anti-Stokes spectral range comprises the spontaneous Brillouin scattering spectrum with optical frequencies higher than the optical frequency of the optical pulsed signal.

The device of the invention may further comprise an optical amplifier located between the circulation means and the detection means.

According to some modes of realization, the bandpass optical filter and the optical amplifier may be located according to any of the following configuration:

the bandpass optical filter and the optical amplifier are located between the circulation means and the coupling means, the bandpass optical filter and the optical amplifier are located between the coupling means and the detection means, the bandpass optical filter is located between the circulation means and the coupling means and the optical amplifier is located between the coupling means and the detection means, the optical amplifier is located between the circulation means and the coupling means and the bandpass optical filter is located between the coupling means and the detection means.

According to some modes of realization, the detection means may further comprise:

an electronic lowpass filter with a bandwidth smaller than the Stokes or the anti-Stokes spectral width of the spontaneous Brillouin scattering spectrum potentially resulting from the propagation of the optical pulsed signal in the sensing fiber;

an electronic bandpass filter with a bandwidth smaller than the Stokes or the anti-Stokes spectral width of the spontaneous Brillouin scattering spectrum potentially resulting from the propagation of the optical pulsed signal in the sensing fiber;

an electronic lowpass filter and/or an electronic bandpass filter with a bandwidth smaller than 10 MHz;

a photo-detector with an electronic bandwidth smaller than 1 GHz.

According to some modes of realization, the device of the invention may further comprise second switching means for doing at least one of the following tasks:

selecting a sensing optical fiber among a plurality of potentially usable optical fibers, selecting a second optical fiber among a plurality of potentially usable optical fibers, exchanging a sensing optical fiber and a second optical fiber.

According to some modes of realization, the device of the invention may further comprise second detection means for detecting the backscattered signal arising from the sensing optical fiber at the frequency of the optical pulsed signal.

This backscattered signal corresponds to the Rayleigh scattering. It may be used for detecting discontinuities along the sensing fiber, such as for instance the location of a break.

So the device of the invention may further comprise an Optical Time-Domain Reflectometer (OTDR) with second detection means and processing means for analyzing the time profile of the Raleigh scattering, so as to locate discontinuities along the sensing fiber(s).

According to another aspect, it is proposed a Brillouin optical distributed sensing method, comprising steps of:

generating an optical pulsed signal and an optical probe signal, using circulation means, directing said optical pulsed signal to a sensing optical fiber, and directing an optical measurement signal with Brillouin scattering information arising from said sensing optical fiber toward detection means, the method further comprising steps of generating:

according to a first configuration, an optical measurement signal with stimulated Brillouin scattering information resulting from the interaction of the optical pulsed signal and an optical probe signal propagating in said sensing optical fiber in a direction opposite to the optical pulsed signal, according to a second configuration, an optical measurement signal with spontaneous Brillouin scattering information resulting from the propagation of the optical pulsed signal in the sensing optical fiber.

The method of the invention may further comprise steps of routing the optical probe signal using optical routing means:

according to a first configuration, to a second optical fiber with a distal end connected to the distal end of the sensing fiber, according to a second configuration, to coupling means inserted between the circulating means and the detection means so as to combine coherently said optical probe signal and said measurement signal on the detection means.

The method of the invention may further comprise steps of:

varying a probe optical frequency of the optical probe signal over a frequency range which covers at least the frequency range of a Stokes or an anti-Stokes spontaneous Brillouin scattering spectrum potentially resulting from the propagation of the optical pulsed signal in the sensing fiber, and for at least one probe optical frequency, collecting on the detection means (i) in the first configuration a stimulated Brillouin scattering signal at said probe optical frequency, or (ii) in the second configuration a beat signal with a spectral content corresponding to the spontaneous Brillouin scattering spectrum shifted in frequency of an amount corresponding to said optical probe frequency.

The method of the invention may further comprise a step of filtering the beat signal with an electronic lowpass or bandpass filter with a bandwidth smaller than the Stokes or the anti-Stokes spectral width of the spontaneous Brillouin scattering spectrum potentially resulting from the propagation of the optical pulsed signal in the sensing fiber.

The invention allows doing measurements using a stimulated Brillouin scattering scheme (first configuration) or a spontaneous Brillouin scattering scheme (second configuration) with the same components, by just routing differently an optical path.

In both cases, the optical probe signal is used for scanning a range of optical frequencies corresponding to a Brillouin spectrum. But in the stimulated Brillouin scattering scheme it is used to stimulate the Brillouin scattering, whereas in the spontaneous Brillouin scattering scheme it is used as a local oscillator in an optical heterodyne detection scheme.

Thanks to this original implementation of the spontaneous Brillouin scattering scheme, the same narrow-bandwidth detection means may be used in both modes. With the optical heterodyne detection, it is indeed not necessary to have detection means with a bandwidth covering the complete Brillouin frequency shift as in classical spontaneous Brillouin scattering schemes. So the sensitivity of this detection may be optimized in both modes.

So it is a key advantage of the invention to have done a stimulated Brillouin scattering detection system that may be easily reconfigured in spontaneous Brillouin scattering detection system for allowing measurements even on damaged sensors.

It is a key advantage of the invention to have done such system so that the spontaneous Brillouin scattering detection scheme is implemented with the same components as the stimulated Brillouin scattering detection scheme, so as to avoid excessive complexity and extra cost.

It is also an advantage of the invention to have found an original mode of implementation of a spontaneous Brillouin scattering scheme, which allows using narrow-bandwidth detection for an improved sensitivity relative to the classical implementation.

BRIEF DESCRIPTION OF THE DRAWINGS

The methods according to embodiments of the present invention may be better understood with reference to the drawings, which are given for illustrative purposes only and are not meant to be limiting. Other aspects, goals and advantages of the invention shall be apparent from the descriptions given hereunder.

DETAILED DESCRIPTION

Figure 1:
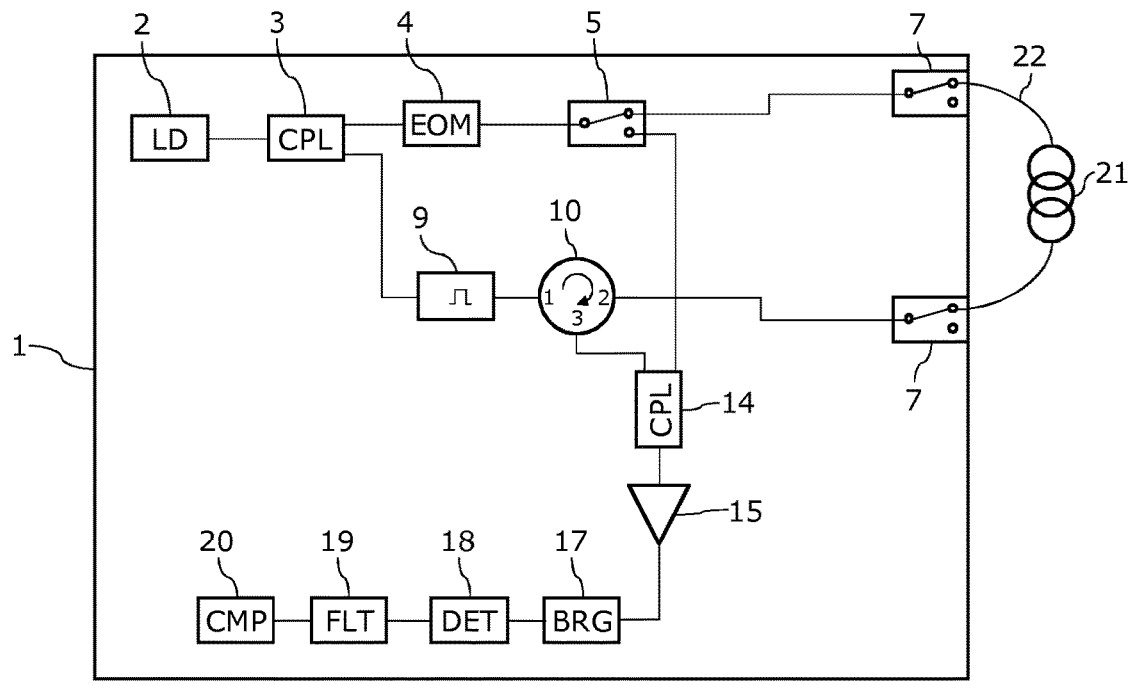
FIG. 1 shows a schematic view of a device of the invention, configured according to a stimulated Brillouin scattering scheme.
Figure 2:
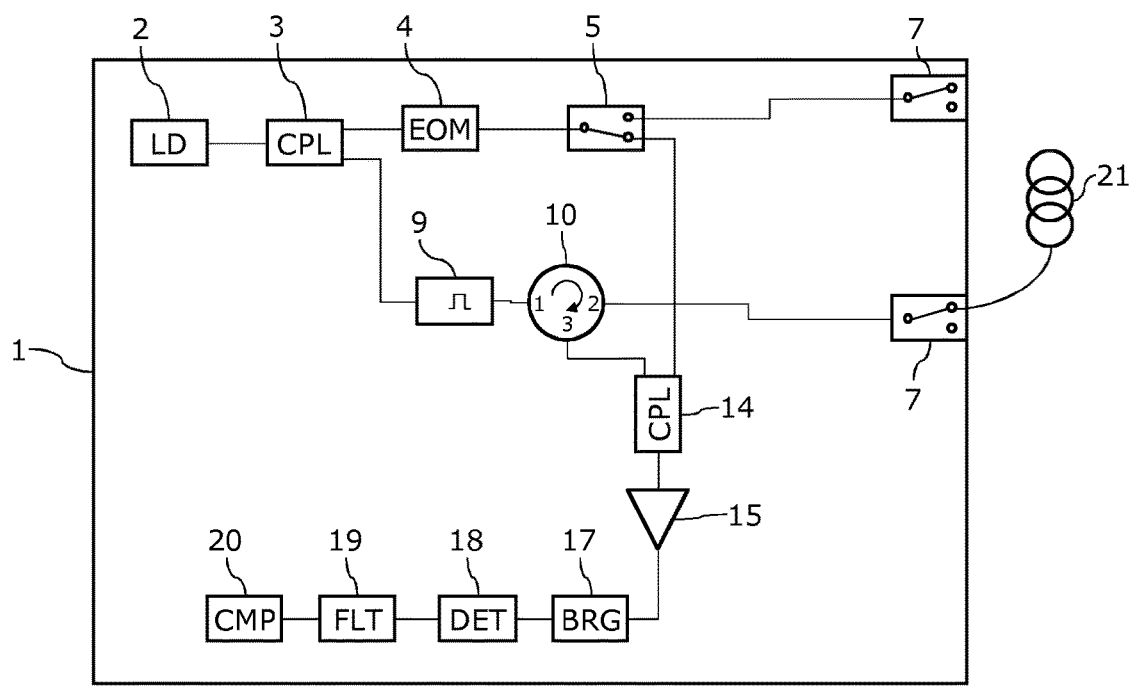
FIG. 2 shows a schematic view of a device of the invention, configured according to a spontaneous Brillouin scattering scheme.

With reference to FIG. 1 and FIG. 2, we will now describe a mode of realization of a Brillouin optical distributed sensing device of the invention.

For sake of clarity, only the components which are relevant for the description of the invention are shown on FIG. 1 and FIG. 2. It is obvious that the device of the invention may include any other necessary components.

In the mode of realization presented on FIG. 1 and FIG. 2, the sensing device of the invention 1 comprises a light source 2 which is used for generating all necessary optical signals. This light source 2 comprises a distributed feedback laser diode (DFB-LD) which generates a continuous wave.

A source coupler 3 directs a part of the light issued from the source 2 towards a pulse generator 9 for generating an optical pulsed signal.

The pulse generator 9 comprise a semiconductor optical amplifier (SOA) driven by an electrical pulsed signal. A variable optical attenuator and an erbium-doped fiber amplifier, not shown on the figures, are cascaded with the pulse generator 9 for adjusting the levels of the signals as necessary.

The optical pulsed signal is then routed through an optical circulator 10 and an optical multiplexer 7 toward a sensing fiber 21 of a distributed sensor connected to the sensing device 1.

The optical circulator 10 is a well-known optical device which allows:
- directing an optical signal incident on a first branch (label "1") of the circulator to a second branch (label "2"), and
- directing an optical signal incident on the second branch of the circulator to a third branch (label "3").

The optical multiplexer 7 (which basically comprises optical switches) allows connecting different sensing fibers 21 and/or different distributed sensors to the sensing device 1.

The source coupler 3 directs also a part of the light of the source 2 towards an electro-optic modulator 4 used as frequency converter, so as to generate an optical probe signal. The electro-optic modulator 4 is configured so as to modulate the intensity of the incoming signal according to a Dual Side Band with Suppressed Carrier (DBS-SC) modulation scheme. So, the generated optical probe signal comprises two spectral components located symmetrically relative to the frequency of the laser source 2. The frequency of these spectral components may be varied by varying the control signal applied to the electro-optic modulator 4.

The electro-optic modulator 4 is preferably a lithium niobate electro-optic modulator based on a Mach-Zehnder architecture. In order to generate the Dual Side Band with Suppressed Carrier (DSB-SC) modulation, a control signal is applied, which comprises:
- a bias voltage establishing a destructive interferences condition between the optical waves in both arms of the interferometer (extinction condition), and,
- a modulation voltage at a frequency corresponding to the desired frequency shift of the spectral components of the optical probe signal relative to the optical frequency of the incoming optical signal.

An optical isolator and means for adjusting the level of the optical probe signal (comprising a power monitoring device with a tap coupler and an electrically controlled variable optical attenuator), not shown on the figures, are cascaded with the electro-optic modulator 4.

The device of the invention further comprises an optical mode switch 5 which allows configuring the sensing device 1 for doing, respectively, stimulated Brillouin scattering measurements or spontaneous Brillouin scattering measurements.

FIG. 1 shows the sensing device 1 configured for doing stimulated Brillouin scattering measurements. The optical mode switch 5 is configured so as to route the optical probe signal through the optical multiplexer 7 toward a second fiber 22 of a distributed sensor connected to the sensing device 1. That second fiber 22 is connected to the distal end of the sensing fiber 21. So, the optical probe signal travels through the sensing fiber 21 in the direction opposite to the optical pulsed signal.

Of course, the second fiber 22 and the sensing fiber 21 may be just parts of a single optical fiber loop.

As previously explained, when the optical frequency of the optical probe signal matches a Brillouin frequency of the spontaneous Brillouin scattering spectrum generated by the optical pulsed signal in the sensing fiber 21, an energy transfer occurs between both signals which modifies the intensity or the amplitude of the optical probe signal:
- when the frequency of the lower spectral component of the probe optical wave falls within the frequency range of the Stokes spontaneous Brillouin spectrum, this stimulation induces an energy transfer from the pulsed optical wave to the lower spectral component of the probe optical wave and an amplification of the lower spectral component of the probe optical wave (gain mode);
- due to the symmetry between the lower and upper spectral component of the probe optical wave around the laser frequency, at the same time, the frequency of the upper spectral component of the probe optical wave falls within the frequency range of the anti-Stokes spontaneous Brillouin spectrum, this stimulation induces an energy transfer from the upper spectral component of the probe optical wave to the pulsed optical wave and an attenuation of the upper spectral component of the probe optical wave (loss mode).

It is necessary for the detection to select the loss mode or the gain mode as the power transfer cancels out between both modes.

The optical probe signal with the Brillouin information emerging from the sensing fiber 21 is then directed by the optical circulator 10 towards the photodetector 18.

The device further comprises an optical bandpass filter 17 inserted between the optical circulator 10 and the photodetector 18 to select the detection mode (loss mode or gain mode).

That optical bandpass filter 17 comprises a circulator and a fiber Bragg grating (FBG) inserted in one branch of the circulator and operated in reflection. The optical probe signal with the Brillouin information is incident on a first branch of the circulator. It is then directed towards the second branch of the circulator, which comprises a fiber Bragg grating (FBG). The FBG reflects only the spectral components which fall within a specific optical bandwidth. These reflected components are then directed by the circulator towards the third branch.

The optical bandpass filter 17 is tuned so as to allow the transmission through the filter of the optical frequencies which falls within the frequency range of the anti-Stokes spontaneous Brillouin spectrum, and to reject the optical frequencies which falls within the frequency range of the Stokes spontaneous Brillouin spectrum. So the stimulated Brillouin detection is operated in loss mode.

An optical amplifier 15 is inserted between the optical circulator 10 and the photodetector 18 to improve the signal to noise ratio. This optical amplifier 15 may for instance comprise an Erbium Doped Fiber Amplifier (EDFA).

The device of the invention further comprises a detection coupler 14 with an output connected to the optical amplifier 15. That detection coupler 14 comprises one input branch connected to the circulator 10 and another input branch connected to the optical mode switch 5. In the stimulated Brillouin detection scheme of FIG. 1, the only function of that detection coupler 14 is to route the optical signal emerging from the optical circulator 10 towards the photodetector 18.

Preferably, the detection coupler 14 has an unbalanced coupling ratio such as 95% from the circulator 10 and 5% from the optical mode switch 5.

The photodetector 18 transforms the optical signal in electrical signals that may be filtered by an electronic filter 19 (if necessary) and processed by the computing means 20.

FIG. 2 shows the sensing device 1 configured for doing spontaneous Brillouin scattering measurements. The optical mode switch 5 is configured so as to route the optical probe signal to the detection coupler 14.

The only signal injected in the sensing fiber 21 is the optical pulsed signal. It generates a spontaneous Brillouin scattering wave which travels in the opposite direction in the sensing fiber 21.

The spontaneous Brillouin scattering wave emerging from the sensing fiber 21 is directed by the circulator 10 towards the detection coupler 14.

The detection coupler 14 allows mixing coherently the optical probe signal and the spontaneous Brillouin scattering wave so that they both enter into the photodetector 18 after having passed through the optical amplifier 15 and the optical bandpass filter 17. So the photodetector 18 may detect signals at the beat frequencies between the spontaneous Brillouin scattering wave and the optical probe signal.

Stimulated Brillouin Measurements

Figure 3:
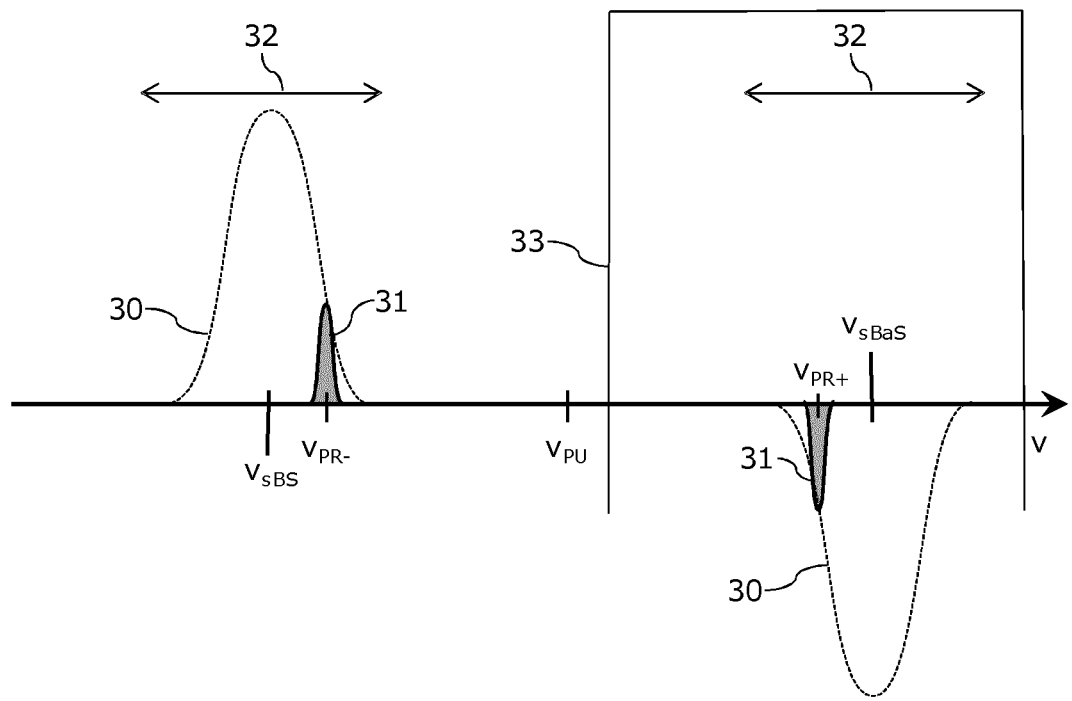
FIG. 3 shows the optical spectrum of the signal incident toward the detector in the stimulated Brillouin scattering scheme.

With reference to FIG. 3, we will now describe the acquisition and processing of measurements with a sensing device 1 of the invention, in the configuration of FIG. 1 for stimulated Brillouin measurements.

The optical pulsed signal is injected into the sensing fiber 21. It comprises an optical frequency $v_{PU}$ which corresponds to the optical frequency of the laser source 2.

The optical probe signal generated by the optical modulator 4 is also injected into the sensing fiber 21 in the direction opposite to the optical pulsed signal. It comprises two spectral components 31 of optical frequencies $v_{PR+}$ and $v_{PR-}$. These spectral components are located symmetrically relative to the optical frequency $v_{PU}$ of the pulsed signal.

The propagation of the optical pulsed signal in the sensing fiber 21 generates Brillouin scattering. The spectrum of that Brillouin scattering comprises two spectral components 30, including a Stokes component around a center frequency $v_{sBs}$ lower than the pulsed signal optical frequency $v_{PU}$ and an anti-Stokes component around a center frequency $v_{sBas}$ higher than the pulsed signal optical frequency $v_{PU}$. As the spontaneous Brillouin scattering depends on the local conditions along the sensing fiber 21, the Brillouin spectrum may also vary along the fiber depending on the local conditions of temperature and strain.

The frequency of the optical probe signal traveling through the sensing fiber 21 in the direction opposite to the optical pulsed signal is varied so as to scan the frequency ranges 32 where Brillouin spectrum may appear.

As previously explained, when the optical frequency of the optical probe signal is scanned over the spectral range of the spontaneous Brillouin scattering generated by the optical pulsed signal in the sensing fiber 21, an energy transfer occurs between both signals which modifies the amplitude of the optical probe signal. The optical frequency of the probe signal at which the maximum modification of the probe signal amplitude has occurred is defined as Brillouin frequency. The energy transfer induces a gain in the Stokes region of the Brillouin spectrum and a loss in the anti-Stokes region.

FIG. 3 illustrates the spectral intensity of the optical probe signal which emerges from the sensing fiber 21 or the optical circulator 10. The spectral intensity is shown in terms of variations (gains and losses) relative to a reference value. It comprises the Stokes and the anti-Stokes contributions of the Brillouin spectrum.

The Stokes region of the Brillouin spectrum is then filtered out by the bandpass filter 17 so that only the anti-Stokes region falling within the spectral range 33 of the filter 17 is transmitted towards the photodetector 18, which measures its intensity.

So, for a given probe frequency $v_{PR+}$ (respectively $v_{PR-}$), we obtain at the output of the photodetector 18 an electrical signal whose time profile is representative of the Brillouin scattering along the sensing fiber 21 at that probe frequency $v_{PR+}$ (respectively $v_{PR-}$). Knowing the speed of light in the fiber, the time profile may be converted in distance profile. The resolution in distance or time of the measurements depends on the pulse duration of the optical pulsed signal.

Then, by scanning the probe frequency $v_{PR+}$ (respectively $v_{PR-}$) over the frequency ranges 32 where Brillouin spectrum may appear, the Brillouin scattering spectrum 30 may be sampled in frequency for any location along the sensing fiber 21.

The spectral resolution with which the Brillouin scattering spectrum 30 may be sampled depends on the spectral width of the optical probe signal 31. Typically, the spectral width of the Brillouin scattering spectrum 30 may be in the order of 30 MHz and the spectral width of the optical probe signal may be in the order of 2 MHz.

In the stimulated Brillouin scattering scheme, little further processing is necessary after the detector 18. The signal may just be lowpass filtered by an electronic filter 19 before being transmitted to a computing unit 20, but this is even not mandatory.

The advantages of this detection scheme are quite straightforward:

the optical power of the optical probe signal is much stronger than that of the spontaneous Brillouin scattering, so measurements may be done with a high sensitivity, a high measurement accuracy, a good spatial resolution and a fast measurement speed;

the required bandwidth of the photodetector 18 is determined by the desired spatial resolution. For instance, to perform distributed sensing with 10 centimeters spatial resolution, an optical pulsed signal with a pulse width of about 1 nanosecond must be used. In that case, the detector bandwidth must be at least 1 GHz. However, for most field applications, a spatial resolution of a few meters only is required, and a detector bandwidth of a few hundreds of MHz is sufficient.

Spontaneous Brillouin Measurements

Figure 4:
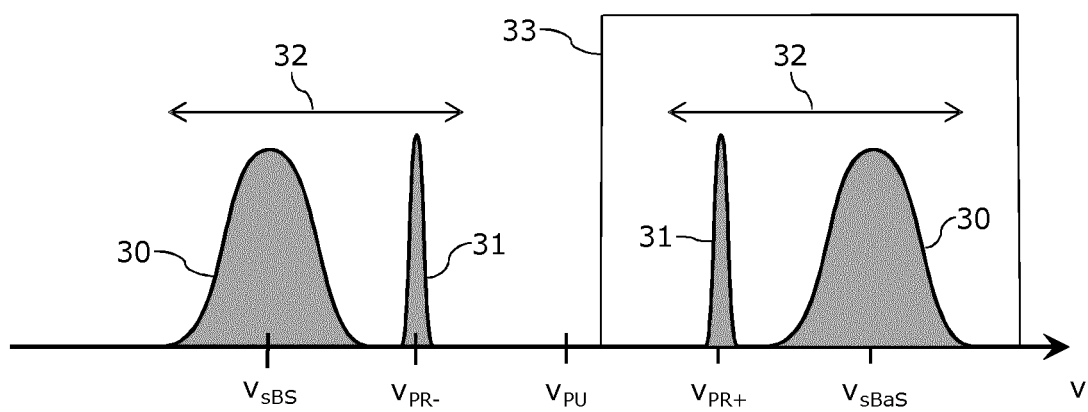
FIG. 4 shows the optical spectrum of the signals incident toward the detector in the spontaneous Brillouin scattering scheme.
Figure 5:
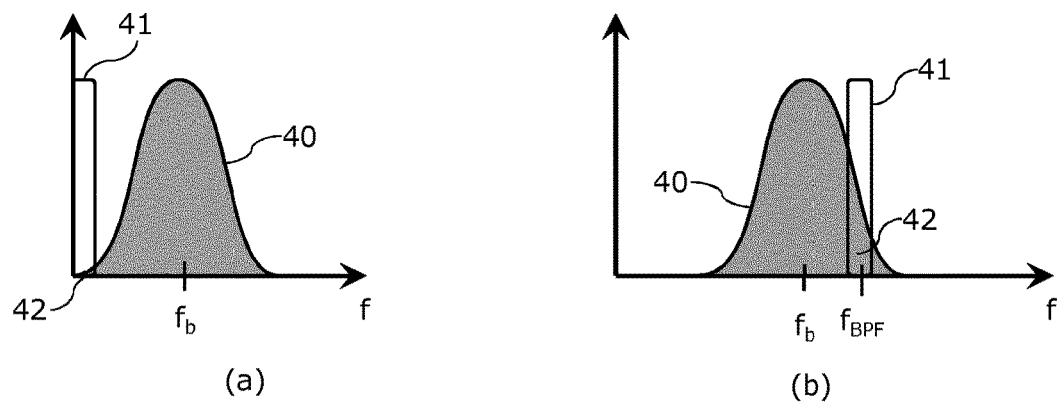
FIG. 5 shows the electrical frequency spectrum of the beat signals detected in the spontaneous Brillouin scattering scheme, using respectively, FIG. 5(a) a low-pass filter, and FIG. 5(b) a band-pass filter.

With reference to FIG. 4 and FIG. 5, we will now describe the acquisition and processing of measurements with a sensing device 1 of the invention, in the configuration of FIG. 2 for spontaneous Brillouin measurements.

The optical pulsed signal is injected into the sensing fiber 21. It has an optical frequency $v_{PU}$ which corresponds to the optical frequency of the laser source 2.

The propagation of the optical pulsed signal in the sensing fiber 21 generates a spontaneous Brillouin scattering signal which travels in the opposite direction with respect to the optical pulsed signal in the sensing fiber 21.

The spectrum of that spontaneous Brillouin scattering signal comprises two spectral components 30, including a Stokes component around a center frequency $v_{sBs}$ lower than the pulsed signal optical frequency $v_{PU}$ and an anti-Stokes component around a center frequency $v_{sBaS}$ higher than the pulsed signal optical frequency $v_{PU}$. As the spontaneous Brillouin scattering depend on the local conditions along the sensing fiber 21, the Brillouin spectrum may also vary along the fiber depending on the local conditions of temperature and strain.

The spontaneous Brillouin scattering signal is collected at the output of the sensing fiber 21 and directed towards the detection coupler 14.

The optical probe signal generated by the optical modulator 4 is also directed towards the detection coupler 14. It comprises two spectral components 31 of optical frequencies $v_{PR+}$ and $v_{PR-}$. These spectral components are located symmetrically relative to the optical frequency $v_{PU}$ of the pulsed signal.

The spontaneous Brillouin scattering signal and the optical probe signal are thus coherently mixed by the detection coupler 14

FIG. 4 shows the spectral components of the mixed signals at the output of the detection coupler 14, which comprise:

the two spectral components 31 of the optical probe signal located respectively at the optical frequencies $v_{PR+}$ and $v_{PR-}$, and the Stokes and the anti-Stokes components 30 at respective center frequency $v_{sBS}$ and $v_{sBaS}$ of the spontaneous Brillouin spectrum.

The spectral components of the spontaneous Brillouin spectrum 30 and of the optical probe signal 31 falling in the Stokes region are then filtered out by the bandpass filter 17, so that only the corresponding spectral components 30, 31 falling in the anti-Stokes region within the spectral range 33 of the filter 17 are transmitted towards the photodetector 18. It should be noted that in the spontaneous Brillouin measurement mode, the bandpass filter 17 is not mandatory for the detection. It just allows reducing unwanted optical noise.

The detection coupler 14 and the photo-detector 18 allow doing an optical heterodyne detection. Thanks to the quadratic response of the photodetector 18 (relative to the amplitude of the optical waves) and its limited bandwidth, the electronic beat signal at the output of that photo-detector 18 comprise spectral terms at frequency differences (or beat frequencies) between the spontaneous Brillouin scattering signal and the optical probe signal.

As shown in FIG. 5(a) and FIG. 5(b), the spectral profile 40 of this electronic beat signal is given by the convolution of two spectra of the optical probe signal 31 and the spontaneous Brillouin scattering signal 30. In general, the spectral width of the optical probe signal 31 (which is typically 2 MHz) is much narrower than that of the spontaneous Brillouin scattering signal 30 (which is typically 30 MHz but which could be larger because of gain broadening depending on the pulse duration and thus on the spatial resolution), so that the beat signal spectrum 40 is nearly identical to the spectral shape 30 of the spontaneous Brillouin scattering signal. The spectrum of this electronic beat signal 40 is then located around a center frequency $f_b$ corresponding to the differential frequency between the Brillouin frequency shift and the optical probe signal frequency:

$$f_b = abs(v_{sBS} - v_{PR-}) = abs(v_{sBaS} - v_{PR+}),$$

where "abs" denotes the absolute value.

Because the Brillouin frequencies $v_{sBS}$ and $v_{sBaS}$ are about 11 GHz away from the optical frequency $v_{PU}$ of the pulsed signal, even if no bandpass filter 17 is used the Stokes and the anti-Stokes terms do not mix up, provided that the bandwidth of the photodetector 18 is limited enough.

As previously said, the spectral width of the spontaneous Brillouin scattering spectrum 30 depends on the spatial resolution. A shorter spatial resolution requires a pulsed optical signal with shorter pulses which in turn require a higher bandwidth.

More precisely, the spontaneous Brillouin scattering spectrum 30 which is to be detected corresponds to the convolution product of the "intrinsic" spontaneous Brillouin scattering spectrum and the power spectrum of the pulsed optical signal. The "intrinsic" spontaneous Brillouin scattering spectrum (whose spectral width is about 30 MHz) corresponds to a stationary case, with no variations along the fiber.

For instance, as a matter of example, a bandwidth of the spontaneous Brillouin scattering spectrum 30 of about:

30 MHz corresponds to a static or a quasi-static case with a very coarse spatial resolution;

50 MHz corresponds to a spatial resolution of about 3 meters;

80 MHz corresponds to a spatial resolution of about 1.5 meters.

In practice, the photo-detector 18 has an electronic bandwidth limited to a few hundreds of MHz, up to 1 GHz.

The photodetector 18 is followed by an electronic filter 19 which is used to sample in frequency the electronic beat signal 40. This filter may be either:

a lowpass filter, or a bandpass filter with a fixed center frequency.

Basically, the electronic signal at the output of the filter 19 corresponds to the amplitude of the spectral components 42 of the electronic beat signal 40 which fall within the spectral range 41 of the filter 19.

FIG. 5(a) illustrates a situation in which the filter 19 is a lowpass filter. The output of the filter 19 corresponds to the spectral components 42 of the electronic beat signal 40 which correspond in turn to the spectral components of the spontaneous Brillouin spectrum with optical frequencies $v_{Bi} = v_{PR+}$ (for the anti-Stokes components).

In that case, the output of the filter 19 is directly a signal representative of the time profile of the spectral components of the spontaneous Brillouin spectrum.

FIG. 5(b) illustrates a situation in which the filter 19 is a bandpass filter with center frequency $f_{BPF}$. The output of the filter corresponds to the spectral components 42 of the electronic beat signal 40 which correspond in turn to the spectral components of the spontaneous Brillouin spectrum with optical frequencies $v_{Bi}$ such as: $abs(v_{Bi}-v_{PR+})=f_{BPF}$ (for the anti-Stokes components).

In that case, the output of the filter 19 is also a signal whose amplitude is representative of the time profile of the spectral components of the spontaneous Brillouin spectrum.

The electronic filter 19 may be for instance a bandpass electronic filter 19 centered at $f_{BPF}$=300 MHz.

Provided that the electronic filter 19 (either lowpass or bandpass) has a bandwidth (for instance 5 MHz) which is much narrower than the spectral width of the beat signal spectrum (typically 30 MHz), the intensity of the spontaneous Brillouin spectrum over a particular optical frequency range frequencies $v_{Bi}$ can be measured in time, hence in distance.

So, for a given set of probe frequencies $v_{PR+}$ and $v_{PR-}$, we obtain at the output of the electronic filter 19 an electrical signal whose time profile is representative of the Brillouin scattering along the sensing fiber 21 at the optical frequency $v_{Bi}$ (for the Stokes spectrum). Knowing the speed of light in the fiber, the time profile may be converted in distance profile. The resolution in distance or time of the measurements depends on the pulse duration of the optical pulsed signal.

Then, by scanning the probe frequencies $v_{PR+}$ (and $v_{PR-}$) over the frequency ranges 32 where Brillouin spectrum may appear, the Brillouin scattering spectrum 30 may be sampled at any location along the sensing fiber 21.

When using a bandpass filter 19, it is possible to have a duplication of the spontaneous Brillouin spectrum by a frequency difference corresponding to twice the central frequency of the bandpass filter 19. This may happen when the probe frequency is scanned over a large span, e.g. the span of the probe frequency is larger than the central frequency of the bandpass filter 19.

More precisely, as explained before, the output of the bandpass filter 19 corresponds to the spectral components of the spontaneous Brillouin spectrum with optical frequencies $v_{Bi}$ such as: $abs(v_{Bi}-v_{PR+})=f_{BPF}$ (for the anti-Stokes components).

Provided that $f_{BPF}>0$, this equality has two solutions:

$$v_{Bi}-v_{PR+}=f_{BPF}; v_{PR+}<v_{Bi}$$

$$v_{PR+^*}-v_{Bi}=f_{BPF}; v_{PR+^*}>v_{Bi}$$

which leads to, by summing the equations:

$$v_{PR+^*}-v_{PR+}=2f_{BPF}.$$

Of course, the same reasoning applies to the Stokes components.

So the same optical frequencies $v_{Bi}$ may be «read» two times, provided that the probe beam is scanned over a range 32 large enough to include the optical frequencies $v_{PR+^*}$ and $v_{PR+}$.

This duplication can be used to implement a two peaks fitting algorithm with fixed frequency difference which allows enhancing the detection performances.

It is important to notice that:

the detection scheme used in the spontaneous Brillouin scattering case, with the low-pass filter, is fully compatible with the detection requirements of the stimulated Brillouin scattering measurements. So the same hardware may be used in both cases. However, the small bandwidth of the low-pass filter (typically 10 MHz) limits the spatial resolution to typically 10 m which may not be adequate for field application;

the use of the bandpass filter in the spontaneous Brillouin scattering case does not limit the spatial resolution provided its center frequency is high enough; for instance a 200 MHz center frequency is compatible with 0.5 m spatial resolution. However, the bandpass filter needs to be bypassed for detection scheme based on the stimulated Brillouin process;

the detection scheme used in the spontaneous Brillouin scattering case requires a bandwidth which is much smaller than the Brillouin shift (about 11 GHz). So the sensitivity may be optimized even in that case;

On both cases (stimulated or spontaneous Brillouin scattering), we obtain time profile signals corresponding to frequency bands of the Brillouin spectrum. So the processing of these signals to obtain the temperature and/or strain profiles is very similar or even identical.

According to some modes of realization, the pulse generator 9 may comprise a lithium niobate electro-optic modulator based on a Mach-Zehnder architecture and driven by a control voltage. The optical pulses is then generated by switching the control voltage from a value leading to destructive interferences between the optical waves in both arms of the Mach-Zehnder interferometer (extinction condition) to a value leading to constructive interferences between the optical waves in both arms of the interferometer (maximum of intensity condition).

According to some modes of realization, the device of the invention may comprise:

no optical amplifier 15;

no optical bandpass filter 17 in the spontaneous Brillouin measurement configuration, or an optical bandpass filter 17 which is by-passed (for instance using optical switches) in that configuration;

an optical amplifier 15 and an optical bandpass filter 17 inserted between the circulator 10 and the detection coupler 14. In that case, only the signals with the Brillouin information arising from the sensing fiber 21 are amplified and filtered;

an optical amplifier 15 inserted between the circulator 10 and the detection coupler 14, and an optical bandpass filter 17 inserted between the detection coupler 14 and the photodetector 18. In that case, the amplification is applied only to the signals with the Brillouin information arising from the sensing fiber 21.

Figure 6:
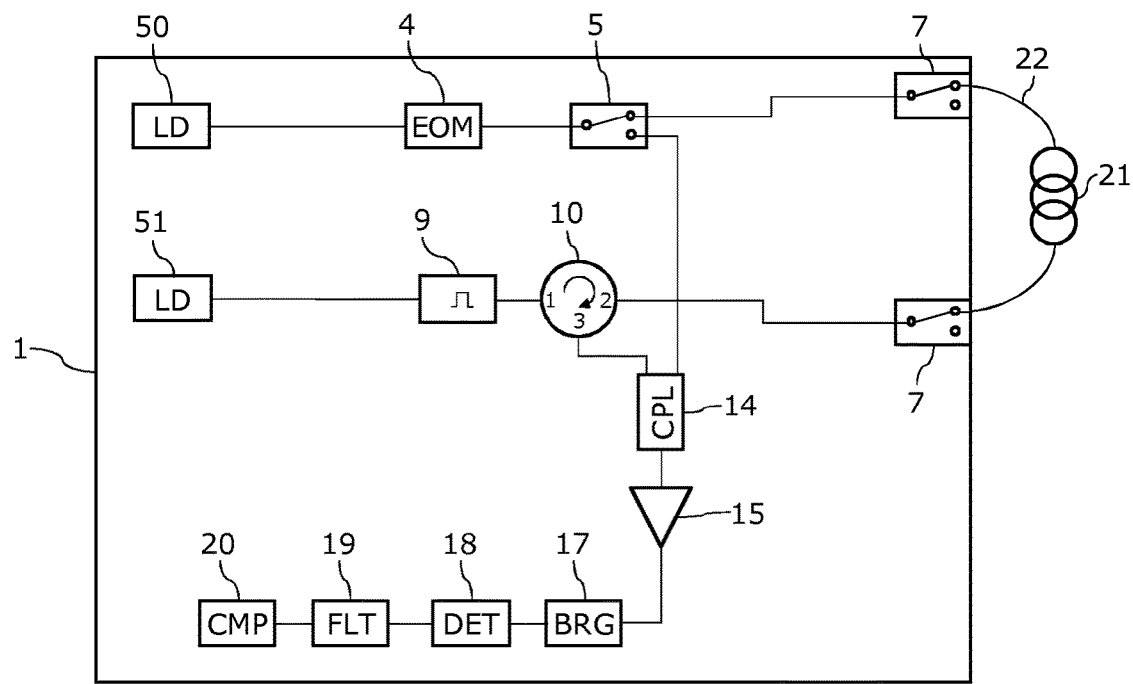
FIG. 6 shows a schematic view of a second mode of realization of a device of the invention, configured according to a stimulated Brillouin scattering scheme.

With reference to FIG. 6, according to some modes of realization, the device of the invention 1 may comprise a first laser source 51 for generating the optical pulsed signal and a second laser source 50 for generating the optical probe signal. For instance:

the frequencies of the two distinct lasers 50, 51 may be locked onto each other, so that the relative frequency between the two lasers is well secured to be stable, while scanning the probe frequency to interrogate the distributed Brillouin gain/loss spectrum;

the two lasers 50, 51 may be free-running. The relative frequency between the two lasers may be recorded while scanning the probe frequency for a fixed optical pulsed signal frequency. Then the recorded relative frequency may be used to compensate any possible distortion imposed onto the spectrum of the Brillouin gain/loss spectrum caused by the free-running feature of the two lasers.

Of course, the device of the mode of realization shown in FIG. 6 may be used and operated in the same way as the device of the mode of realization shown in FIG. 1 and FIG. 2, for similar results. So, everything which has been explained in relation with the mode of realization of FIG. 1 and FIG. 2 applies to the mode of realization of FIG. 6, except of course for the differences in the laser sources.

According to some modes of realization:
the optical bandpass filter 17 may be tuned so as to allow the transmission of the optical frequencies which falls within the frequency range of the Stokes spontaneous Brillouin spectrum, and to reject the optical frequencies which falls within the frequency range of the anti-Stokes spontaneous Brillouin spectrum;
the optical filter 17 may comprise a fiber Bragg grating (FBG) operated in transmission inserted in series in the optical path (without circulator). In that case, the filter 17 is tuned so as to block the unwanted part (Stokes or anti-Stokes) of the spontaneous Brillouin spectrum.

While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

The invention claimed is:

1. A Brillouin optical distributed sensing device, comprising:
means for generating an optical pulsed signal and an optical probe signal;
circulation means for directing said optical pulsed signal to a sensing optical fiber, and for directing an optical measurement signal with Brillouin scattering information arising from said sensing optical fiber toward detection means;
optical routing means for configuring the device so as to allow generating:
according to a first configuration, an optical measurement signal with stimulated Brillouin scattering information resulting from the interaction of the optical pulsed signal and an optical probe signal propagating in said sensing optical fiber in a direction opposite to the optical pulsed signal; and
according to a second configuration, an optical measurement signal with spontaneous Brillouin scattering information resulting from the propagation of the optical pulsed signal in the sensing optical fiber,
optical routing means being arranged for directing the optical probe signal:
according to the first configuration, to the sensing optical fiber so that said optical probe signal propagates in said sensing optical fiber in a direction opposite to the optical pulsed signal, the optical probe signal and the optical pulsed signal propagating in said sensing optical fiber according to the first configuration; and
according to the second configuration, to coupling means inserted between the circulating means and the detection means so as to combine said optical probe signal and said measurement signal on the detection means, so that the optical pulsed signal propagates in said sensing optical fiber according to the second configuration but the optical probe signal does not propagate in said sensing optical fiber according to the second configuration.

2. The device of claim 1, further comprising tuning means for varying the optical frequency of at least one spectral component of at least one of the following optical signals: the optical pulsed signal, the optical probe signal.

3. The device of claim 1, further comprising a laser source used for generating the optical pulsed signal and the optical probe signal.

4. The device of claim 1, wherein the tuning means comprises an electro-optic modulator for varying the optical frequency of at least one spectral component of the probe optical signal.

5. The device of claim 1, further comprising a bandpass optical filter located between the circulation means and the detection means, whose bandwidth includes the Stokes or the anti-Stokes spectral range of the spontaneous Brillouin scattering spectrum potentially resulting from the propagation of the optical pulsed signal in the sensing fiber.

6. The device of claim 5, further comprising an optical amplifier located between the circulation means and the detection means.

7. The device of claim 6, wherein the bandpass optical filter and the optical amplifier are located according to any of the following configurations:
the bandpass optical filter and the optical amplifier are located between the circulation means and the coupling means:
the bandpass optical filter and the optical amplifier are located between the coupling meansand the detection means;
the bandpass optical filter is located between the circulation means and the coupling means and the optical amplifier is located between the coupling means and the detection means; and
the optical amplifier is located between the circulation means and the coupling means and the bandpass optical filter is located between the coupling means and the detection means.

8. The device of claim 1, wherein the detection means further comprises an electronic lowpass filter with a bandwidth smaller than the Stokes or the anti-Stokes spectral width of the spontaneous Brillouin scattering spectrum potentially resulting from the propagation of the optical pulsed signal in the sensing fiber.

9. The device of claim 8, wherein the detection means comprises an electronic lowpass filter and/or an electronic bandpass filter with a bandwidth smaller than 10 MHz.

10. The device of claim 1, wherein the detection means further comprises an electronic bandpass filter with a bandwidth smaller than the Stokes or the anti-Stokes spectral width of the spontaneous Brillouin scattering spectrum potentially resulting from the propagation of the optical pulsed signal in the sensing fiber.

11. The device of claim 1, wherein the detection means further comprises a photo-detector with an electronic bandwidth smaller than 1 GHz.

12. A Brillouin optical distributed sensing method, comprising steps of:
generating an optical pulsed signal and an optical probe signal;
using circulation means, directing said optical pulsed signal to a sensing optical fiber, and directing an optical measurement signal with Brillouin scattering information arising from said sensing optical fiber toward detection means;

generating, according to a first configuration, the optical measurement signal with stimulated Brillouin scattering information resulting from the interaction of the optical pulsed signal and the optical probe signal propagating in said sensing optical fiber in a direction opposite to the optical pulsed signal; and generating, according to a second configuration, the optical measurement signal with spontaneous Brillouin scattering information resulting from the propagation of the optical pulsed signal in the sensing optical fiber, routing the optical probe signal using optical routing means, according to the first configuration, to a second optical fiber with a distal end connected to the distal end of the sensing fiber, the optical probe signal and the optical pulsed signal propagating in said sensing optical fiber according to the first configuration; and routing the optical probe signal using the optical routing means, according to the second configuration, to coupling means inserted between the circulating means and the detection means so as to combine coherently said optical probe signal and said measurement signal on the detection means, so that the optical pulsed signal propagates in said sensing optical fiber according to the second configuration but the optical probe signal does not propagate in said sensing optical fiber according to the second configuration.

13. The method of claim 12, further comprising:

varying a probe optical frequency of the optical probe signal over a frequency range which covers at least the frequency range of a Stokes or an anti-Stokes spontaneous Brillouin scattering spectrum potentially resulting from the propagation of the optical pulsed signal in the sensing fiber.

14. The method of claim 13, which further comprises, for at least one probe optical frequency, collecting on the detection means in the first configuration a stimulated Brillouin scattering signal at said probe optical frequency.

15. The method of claim 13, which further comprises, for at least one probe optical frequency, collecting on the detection means in the second configuration a beat signal with a spectral content corresponding to the spontaneous Brillouin scattering spectrum shifted in frequency of an amount corresponding to said optical probe frequency.

16. The method of claim 15, which further comprises a step of filtering the beat signal with an electronic lowpass or bandpass filter with a bandwidth smaller than the Stokes or the anti-Stokes spectral width of the spontaneous Brillouin scattering spectrum potentially resulting from the propagation of the optical pulsed signal in the sensing fiber.

* * * * *